Oct. 13, 1959     R. L. VARBEL     2,908,080
ADJUSTABLE RAFTER SQUARE
Filed April 8, 1954
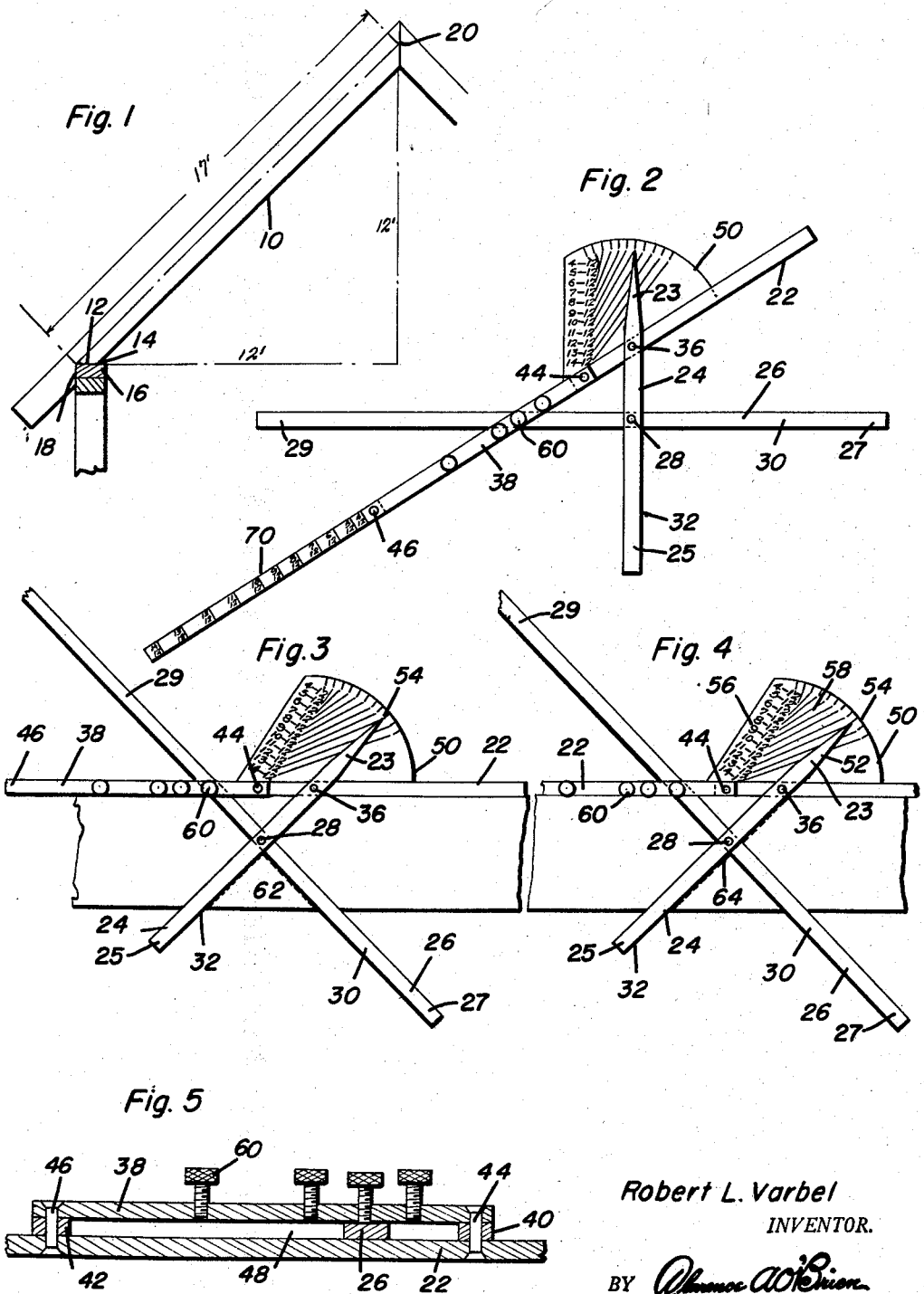
Robert L. Varbel
INVENTOR.

United States Patent Office 2,908,080
Patented Oct. 13, 1959

2,908,080

ADJUSTABLE RAFTER SQUARE

Robert L. Varbel, Oklahoma City, Okla.

Application April 8, 1954, Serial No. 421,801

2 Claims. (Cl. 33—93)

This invention relates to an adjustable rafter square and particularly to a birds mouth gauge type square in which the birds mouth may be adjusted for cutting birds mouth in rafters for various pitch of rafter.

In the operation of preparing rafters for roofs, it is customary to provide a so-called birds mouth cut in the bottom end of a rafter for connection with the plate of a building so that the rafter will properly fit when inclined in the proper pitch. The laying out of birds mouth cuts by means of the usual steel square is a matter of great skill and experience. Heretofore various types of birds mouth gauges have been provided for laying out and marking the birds mouth cut.

The present invention provides a birds mouth square in which the birds mouth may be readily adjusted to various pitches so that the device may be readily reset and locked in set position so that the carpenter may mark out a plurality of birds mouth cuts all at exactly the same angle so that the pitch of all of the rafters will be identical. Further the birds mouth gauge may be utilized to cut the plumb at the top of the rafter so that it will be an exact meet with the opposed rafter.

In the construction according to the invention, a base bar is provided for contact with one edge of a rafter and a square or birds mouth is provided by means of a pair of crossed strip members which are rigidly connected together in square relation with one of the strip members being pivotally connected to the base bar and the other strip member extending in sliding relation therealong so that the pivoted member may be adjusted to any desired angle. A guide is then provided by means of a separate bar arranged in spaced relation to the base bar and locking means are provided in the guide bar for securing the sliding arm of the birds mouth in adjusted position.

Accordingly, an object of the invention is to provide an improved rafter square.

It is a further object of the invention to provide a rafter square which may be adjusted to any desired pitch.

It is a further object of the invention to provide improved means of locking a birds mouth gauge in pitch relation. Other objects and many of the attendant advantages of the present invention will be apparent from the following detailed description, taken in conjunction with the accompanying drawing, in which:

Figure 1 is an illustration of a rafter in position showing the birds mouth cut and the necessary plumb cut;

Figure 2 is a plan view of the birds mouth gauge according to the invention;

Figure 3 is a similar view of the birds mouth gauge set to cut the birds mouth of Figure 1 and shown applied to the rafter;

Figure 4 is a similar view showing the utilization of the adjustable square to produce the plumb cut; and Figure 5 is an enlarged sectional view through the locking mechanism of the device.

In the exemplary embodiment according to the invention, a rafter 10 is provided with a birds mouth cut 12 which is designed to provide a surface 14 for contact with the top surface of a plate 16 and a surface 18 for contact with the side of the plate so that the rafter may be rigidly and firmly supported on the plate. Likewise, the rafter 10 is provided with a vertical cut 20 so that the pair of rafters may be rigidly and firmly joined together at the comb.

In order to provide the birds mouth cut at 12, the rafter square is provided with a base bar 22 adapted to contact the side of the rafter and to support a birds mouth gauge which is constructed by means of a first arm 24 and a second arm 26 which are rigidly connected together by means of the rivet 28 so that the arms 24 and 26 are rigidly secured together in exactly perpendicular relation to each other to provide the birds mouth having the surface 30 for laying out the cut 14 and the surface 32 for laying out the cut 18. First arm 24 has a first part 23 and a second part 25 on opposite sides of rivet 28. Second arm 26 has a first part 27 and a second part 29 on opposite sides of rivet 28.

The arm 24 extends outwardly from the junction of the birds mouth and is provided with a pivotal connection 36 with the base bar 22. Likewise, the arm 26 is extended rearwardly from the birds mouth and engages in sliding relation with the bar 22. A guide bar 38 is mounted in spaced relation to the base bar 22 by means of spacers 40 and 42 and rigidly secured by means of suitable fasteners such as rivets 44 and 46. The spacers 40 and 42 either with or without the guide bar 38 constitute means by which to limit the pivotal movement of arms 24 and 26 by engagement of a part of arm 26 with the spacers. The bars 22 and 38, together with the spacer members 40 and 42, define a longitudinal slot through which the extension of the arm 26 is freely slidable. Obviously, by sliding the arm 26 in the slot 48, the birds mouth may be pivoted about the point 36 to determine the pitch of the birds mouth cut to be laid out thereby.

In order to be able to properly adjust the birds mouth with ease and dispatch, a gauge plate 50 is rigidly attached to the bar 22 and extends outwardly on the opposite side from the birds mouth. The front surface of dial 50 is in a plane parallel to the flat side wall of base bar 22. The arm 24 is provided with a pointer 52 which extends over a scale 54 on the plate 50. The scale 54 will be laid off in indicia corresponding to the various pitches to be laid out by the birds mouth. Preferably, the indicia is provided in the form of a column 56 at one side of the scale and connected to the scale by means of suitable leader lines 58.

In order to secure the device in fixed relation, suitable locking means such as set screws 60 are provided in the guide plate 38 so that when the pointer 52 has been moved to the exact position desired on the scale 54 the set screw 60 will be tightened into engagement with the arm 26 to rigidly secure the same in place so that any desired number of birds mouths may then be marked and cut without disturbing the setting.

In the utilization of the device to cut a birds mouth, the device will be set as shown in Figure 3 with the pointer corresponding to the indicia 12—12 showing a run of 12 and an elevation of 12 as shown in Figure 1. Suitable set screws 60 will then be placed in tight relation with the arm 26 so that the cut may be laid out and marked as shown at 62 in Figure 3.

In order to utilize the device to make the plumb cut at the top of the rafter, the device will be set in the same manner as indicated in Figure 3 so that the plumb cut 20 will be exactly parallel to the cut 18 and the cut will be marked as shown at 64 in Figure 4.

To determine proper length of rafter on any desired pitch of roof, after the pointer 52 is set on the dial 54, locate the corresponding figure on the scale 70 on lower end of base bar 22, then measure the exact distance in inches from this figure to the upper end of base bar 22, then multiply this length by one-half the width of the building, from outer edge of walls, thereby giving the exact length of rafter.

For purpose of exemplification, a particular embodiment of the device has been shown and described according to the best present understanding thereof. However, it will be apparent to those skilled in the art that various changes and modifications in the construction and arrangement of the parts thereof may be readily resorted to without departing from the true spirit and scope of the invention.

What is claimed as new is as follows:

1. An adjustable rafter gauge consisting of a flat elongated base bar having a flat sidewall, a graduated dial protruding from an edge of said base bar and having a front surface which is in a plane parallel to said flat side wall of said bar, a first arm, a second arm, means joining said arms in fixed relationship to each other and at right angles, said first arm having a first part protruding from said arms fixing means at one side thereof and provided with an extension which is movable over the graduations on said dial in order to constitute an indicator, said first arm having a second part protruding from said arms fixing means at the other side thereof, a pivot pin connecting said first part of said first arm to said base bar and holding said first arm with the surface thereof flush against said base bar and thereby enabling said first arm to be pivotally swung with respect to said base bar and the indicator pointing to different graduations on said dial to indicate the angularity of said arms with respect to said base bar, said second arm having a first part protruding from one side of said arms fixing means, said first part of said second arm and said second part of said first arm having confronting edges that are arranged at right angles to each other and that constitute a bird's mouth by which to guide a scriber in making similar representations, said second arm having a second part protruding from the opposite side of said arms fixing means and fitting flush against said flat wall of said base bar, means extending generally parallel to said base bar and terminating between said pivot which connects said first part of said first arm to said base bar and the remote end of said base bar for limiting the extent of pivotal movement of said arms with respect to said base bar by contact of opposite edges of said second part of the second arm therewith.

2. The adjustable rafter gauge of claim 1 wherein said limiting means comprise a U-shaped guide through which said second part of said second arm is passed, and adjustable means carried by said guide and engageable with said second part of said second arm for locking said second part of said second arm and thereby locking both of said arms in the selected adjusted position.

References Cited in the file of this patent

UNITED STATES PATENTS

| 458,441 | Bast | Aug. 25, 1891 |
| 485,456 | Cook | Nov. 1, 1892 |
| 718,817 | Caldwell et al. | Jan. 20, 1903 |
| 743,900 | Mahan | Nov. 10, 1903 |
| 830,322 | Hodge | Sept. 4, 1906 |
| 1,282,999 | Wall | Oct. 29, 1918 |
| 1,365,991 | Helden | Jan. 18, 1921 |
| 1,553,265 | Reppe | Sept. 8, 1925 |
| 1,852,277 | Wheeler | Apr. 5, 1932 |
| 1,947,448 | Ahola | Feb. 20, 1934 |
| 1,983,516 | Ahola | Dec. 11, 1934 |
| 2,090,835 | Gardham | Aug. 24, 1937 |
| 2,574,035 | Heiskell | Nov. 6, 1951 |

FOREIGN PATENTS

| 592,160 | Germany | Feb. 2, 1934 |